J. R. SCOHY.
GLASS DRAWING APPARATUS.
APPLICATION FILED AUG. 2, 1920.
1,372,044.
Patented Mar. 22, 1921.
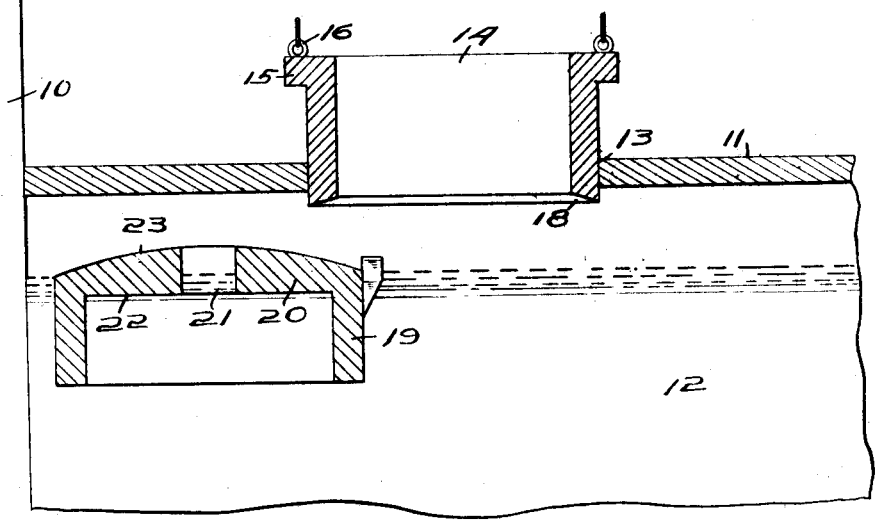
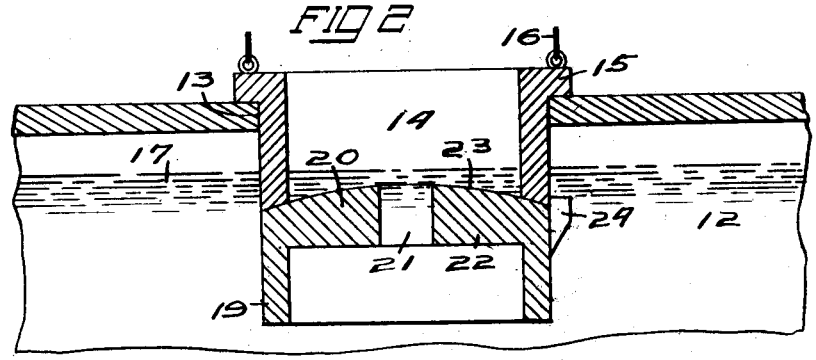
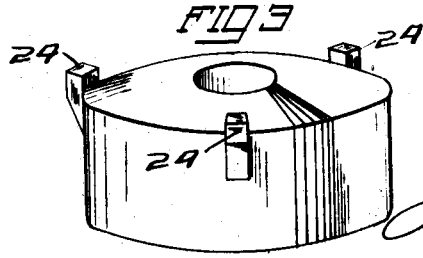

UNITED STATES PATENT OFFICE.

JOHN R. SCOHY, OF OKMULGEE, OKLAHOMA.

GLASS-DRAWING APPARATUS.

1,372,044. Specification of Letters Patent. Patented Mar. 22, 1921.

Application filed August 2, 1920. Serial No. 400,707.

*To all whom it may concern:*

Be it known that I, JOHN R. SCOHY, a citizen of the United States, and a resident of Okmulgee, in the county of Okmulgee and State of Oklahoma, have made an Invention Appertaining to Glass - Drawing Apparatus; and I do hereby declare the following to be a full, clear, and exact description of the invention, such as will enable others skilled in the art to which it appertains to make and use the same, reference being had to the accompanying drawings, and to the characters of reference made thereon, of which the following is a specification.

This invention relates to improvements in glass drawing apparatus, and more particularly for drawing cylinders of glass, either hollow or solid, and the invention comprehends an improvement in the above type of apparatus whereby the molten glass is kept at a uniform substantially furnace heat during drawing.

More specifically, the invention comprises an improved novel inverted pot which is made of fireclay or other refractory substances so as to float on molten glass and movable on the molten glass in the furnace so as to secure a large supply of good, clear glass and so constructed as to facilitate the drawing thereof and cause automatic cleaning or discharge of excess molten glass back into the furnace.

With the above objects and others in view as will appear as the description proceeds, the invention comprises the novel features of construction, combination of elements and arrangement of parts which will be more fully described herein and set forth with particularity in the claims appended hereto.

Reference is had to the accompanying drawings forming a part of this application, wherein similar reference characters will designate corresponding parts throughout the several views, in which—

Figure 1 is a longitudinal sectional view of a part of a glass furnace showing the tank and dog house thereof equipped with the improved device. Fig. 2 is a similar but fragmentary view showing an inverted pot submerged in the molten glass and disposed beneath a shield, containing my invention. Fig. 3 is a perspective view of the inverted pot.

Referring to the drawings in detail, the numeral 10 designates a glass furnace or tank from which leads the dog house or drawing extension 11 into which the molten glass 12 flows as it is melted in the furnace. The dog house is provided with an opening 13 in the top thereof designated to receive for vertical adjustment or movement therein a cylindrical shield-like member 14 preferably provided with a flange 15 at the upper end thereof. An attachment 16 for raising and lowering the shield, is connected to the shield 14.

The shield 14 is designed to be normally raised above the level 17 of the molten glass 12 within the tank or furnace and dog house, and the bottom portion thereof is slightly beveled outwardly as shown at 18, so as to properly fit the contour of the top portion of the inverted pot 19.

The inverted pot 19 has a top wall 20 provided with a central circular aperture or opening 21 therethrough, such opening or orifice being in the central portion of the pot and usually of a diameter less than that of the cylinder to be drawn. The lower surface of the top portion 20 as indicated at 22, is flat, but the upper portion thereof is convexed or rounded as shown at 23. The beveled wall or edge portion 18 fits the top surface of the inverted pot.

In carrying out of the drawing process, the inverted pot is moved out from the tank or furnace to the dog house by means of an iron rod so that it may become replenished with considerable amount of good clear glass. In this position, the level of the glass with respect to the shield and pot will be as shown in Fig. 1 of the drawings. When the pot is disposed beneath the shield 14, the latter is lowered in the manner shown in Fig. 2 of the drawings, so as to submerge the pot and ring in the molten glass below the level thereof, thereby causing the glass to flow through the opening or orifice 21 and above the same over the convexed surface 23. The inverted pot is centered with respect to the shield by means of the three lugs 24 that extend above the lower edge of the sloping surface 23. The lugs 24 also provide means whereby the inverted pot may be drawn into the dog house by an iron rod.

When the pot is lowered the glass is drawn from above the inverted pot and from within the shield 14 until the drawing operation is completed. The shield is then raised and pushed into the tank and such molten glass as is left upon the top portion of the inverted pot will be discharged automatically, the glass gradually running back in the tank and thereby preventing a residue from collecting on the sides of the pot and gradually pulling away from the ring into the glass cylinder so as to cause a part or all of the latter to be wasted, especially after several days' run. This also avoids the necessity of cleaning off the pot after each and every drawing operation and thereby accomplishing quicker work with increased production and at less cost. It should also be noted that the separation and cooling of the glass takes place inside of the shield consequently permitting the drawing of a cylinder of even thickness, more so than when the main body of glass was drawn direct, since the shield maintains a uniform heat around the cylinder. The opening in the top of the inverted pot permits the replenishing of the glass from the pot and inasmuch as the pot contains a large amount of glass it gives a constant supply of heat, which keeps the temperature of the glass up to about that of the furnace.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

I claim:—

1. In combination with a glass furnace and a dog-house, a glass segregating apparatus consisting of a deep inverted pot having a central opening in the top thereof and a sloping exterior surface around the opening and a cylindrical shield having an edge surface conforming to the said sloping surface and adapted to fit the sloping surface and of a length sufficient to reach from the submerged pot to the top of the dog-house, the dog-house being so constructed as to leave unobstructed the said opening of the submerged pot.

2. In combination with a glass furnace and a dog-house, a glass segregating apparatus consisting of a deep inverted pot having a central opening in the top thereof and a sloping exterior surface around the opening and a cylindrical shield having an edge surface conforming to the said sloping surface and adapted to fit the sloping surface and of a length sufficient to reach from the submerged pot to the top of the dog-house, the dog-house being so constructed as to leave unobstructed the said opening of the submerged pot, the top of the pot being provided with lugs for centering the pot relative to the shield.

In testimony whereof I have hereunto signed my name to this specification.

JOHN R. SCOHY.